United States Patent
Stigant et al.

(10) Patent No.: US 11,838,069 B2
(45) Date of Patent: Dec. 5, 2023

(54) METHOD AND APPARATUS FOR TRANSMITTING DATA IN A COMMUNICATION SYSTEM

(71) Applicant: British Telecommunications Public Limited Company, London (GB)

(72) Inventors: Liam Stigant, London (GB); Anas Al Rawi, London (GB); Trevor Linney, London (GB); Leslie Humphrey, London (GB)

( * ) Notice: Subject to any disclaimer, the term of this patent is extended or adjusted under 35 U.S.C. 154(b) by 522 days.

(21) Appl. No.: 15/733,353

(22) PCT Filed: Jan. 2, 2019

(86) PCT No.: PCT/EP2019/050031
§ 371 (c)(1),
(2) Date: Jul. 8, 2020

(87) PCT Pub. No.: WO2019/134911
PCT Pub. Date: Jul. 11, 2019

(65) Prior Publication Data
US 2020/0350951 A1 Nov. 5, 2020

(30) Foreign Application Priority Data

Jan. 8, 2018 (EP) .................................... 18150608

(51) Int. Cl.
*H04B 3/32* (2006.01)
*H04M 1/06* (2006.01)
(Continued)

(52) U.S. Cl.
CPC ............... *H04B 3/32* (2013.01); *H04B 3/487* (2015.01); *H04M 3/34* (2013.01); *H04M 11/062* (2013.01)

(58) Field of Classification Search
CPC ........... H04B 3/32; H04B 3/487; H04M 3/34; H04M 11/062; H04M 11/06
See application file for complete search history.

(56) References Cited

U.S. PATENT DOCUMENTS 6,259,746 B1   7/2001   Levin et al.
9,584,181 B2 *   2/2017   Strobel .................... H04B 3/32
(Continued)

FOREIGN PATENT DOCUMENTS

CN   103532593 A   1/2014
CN   103795439 A   5/2014
(Continued)

OTHER PUBLICATIONS

Combined Search and Examination Report under Sections 17 and 18(3) for Great Britain Application No. GB2019226.6, dated Apr. 23, 2021, 9 pages.
(Continued)

*Primary Examiner* — Derrick W Ferris
*Assistant Examiner* — M Mostazir Rahman

(57) ABSTRACT

A method and apparatus for transmitting data in a communication system including a transmitter and receivers, each receiver being connected to the transmitter via a communication channel, the method including: precoding the data for transmission on the channels to provide first precoded data; using the first precoded data, for each channel, computing a number of bits to be allocated to that channel; determining that the bit allocation does not satisfy one or more criteria; ranking the channels in an order based on channel properties; discarding for use as a direct channel, one or more channels based on the ranking; precoding the data for transmission on the channels accounting for the discarded channels to provide second precoded data; and transmitting, by the transmitter, the second precoded data on the channels.

14 Claims, 4 Drawing Sheets

(51) Int. Cl.
*H04B 3/487* (2015.01)
*H04M 3/34* (2006.01)
*H04M 11/06* (2006.01)

(56) References Cited

U.S. PATENT DOCUMENTS

| | | | |
|---|---|---|---|
| 9,800,720 B2* | 10/2017 | Lu | H04M 3/18 |
| 10,193,594 B2 | 1/2019 | Al Rawi et al. | |
| 2003/0218973 A1 | 11/2003 | Oprea et al. | |
| 2004/0095921 A1 | 5/2004 | Kerpez | |
| 2006/0280237 A1* | 12/2006 | Rhee | H04L 5/0064 |
| | | | 375/222 |
| 2008/0075058 A1 | 3/2008 | Mundarath et al. | |
| 2009/0046568 A1 | 2/2009 | Xu | |
| 2010/0232536 A1 | 9/2010 | Park et al. | |
| 2011/0080969 A1 | 4/2011 | Joengren et al. | |
| 2014/0119536 A1* | 5/2014 | Strobel | H04L 25/00 |
| | | | 379/406.01 |
| 2014/0219074 A1* | 8/2014 | Lu | H04L 25/03885 |
| | | | 370/201 |
| 2015/0295621 A1* | 10/2015 | Wang | H04L 27/2613 |
| | | | 370/201 |
| 2016/0170437 A1* | 6/2016 | Aweya | H04B 10/071 |
| | | | 713/503 |
| 2016/0295014 A1* | 10/2016 | Wei | H04M 3/34 |
| 2016/0380673 A1* | 12/2016 | Pal | H04M 3/2209 |
| | | | 379/417 |
| 2019/0058502 A1* | 2/2019 | Tsiaflakis | H04B 3/32 |
| 2020/0028972 A1 | 1/2020 | Al Rawi et al. | |
| 2020/0228177 A1 | 7/2020 | Mittal et al. | |
| 2021/0194539 A1* | 6/2021 | Bastos Moraes | H04M 3/30 |
| 2021/0288661 A1* | 9/2021 | Nuzman | H03M 7/6011 |

FOREIGN PATENT DOCUMENTS

| | | |
|---|---|---|
| EP | 2819313 A1 | 12/2014 |
| EP | 3154205 A1 | 4/2017 |
| WO | WO-2008030150 A1 | 3/2008 |
| WO | WO-2016139254 A1 | 9/2016 |
| WO | WO-2017129227 A1 | 8/2017 |
| WO | WO-2017195183 A1 | 11/2017 |
| WO | WO-2018004855 A1 | 1/2018 |
| WO | WO-2018128895 A1 | 7/2018 |
| WO | WO-2019134911 A1 | 7/2019 |

OTHER PUBLICATIONS

Communication pursuant to Article 94(3) EPC for Application No. 19700013.6, dated Apr. 30, 2021, 6 pages.
Extended European Search Report for Application No. 18150608.0, dated May 3, 2018, 10 pages.
International Search Report and Written Opinion for Application No. PCT/EP2019/050031, dated Jan. 30, 2019, 11 pages.
Office Action for Chinese Application No. 201980007444.9, dated May 6, 2021, 12 pages.
Office Action for GB Application No. 1800253.5, dated Jun. 1, 2020, 2 pages.
Office Action for GB Application No. 1800253.5, dated Jun. 27, 2018, 5 pages.
Partial Search Report for International Application No. PCT/EP2021/083786, dated Mar. 22, 2022, 13 pages.
Stigant L., et al., "Spatially Adaptive Linear Precoding for Systems Beyond G. fast," 2018, 6 pages.

* cited by examiner

METHOD AND APPARATUS FOR TRANSMITTING DATA IN A COMMUNICATION SYSTEM

PRIORITY CLAIM

The present application is a National Phase entry of PCT Application No. PCT/EP2019/050031, filed Jan. 2, 2019, which claims priority from EP Patent Application No. 18150608.0, filed Jan. 8, 2018, each of which is hereby fully incorporated herein by reference.

TECHNICAL FIELD

The present disclosure relates to a method and apparatus for transmitting data from a transmitter device to a plurality of receiver devices. Such methods include all of the various Digital Subscriber Line (DSL) methods as specified in various International Telecommunications Union (ITU) standards and as being further developed in the ITU at present.

BACKGROUND

DSL technology takes advantage of the fact that although a legacy twisted metallic pair (which was originally installed to provide merely a Plain Old Telephone Services (POTS) telephony connection) might only have been intended to carry signals using differential mode at frequencies of up to a few Kilohertz, in fact such a line can often reliably carry signals at much greater frequencies. Moreover, the shorter the line, the greater is the range of frequencies over which signals can be reliably transmitted (especially with the use of technologies such as Discrete Multi-Tone (DMT), etc.). Thus as access networks have evolved, telecommunications network providers have expanded their fiber optic infrastructure outwards towards the edges of the access network, making the lengths of the final portion of each connection to an end user subscriber (which is still typically provided by a metallic twisted pair) shorter and shorter, giving rise to correspondingly greater and greater bandwidth potential over the increasingly short twisted metallic pair connections without having to bear the expense of installing new optic fiber connections to each subscriber. However, a problem with using high frequency signals is that a phenomenon known as crosstalk can cause significant interference reducing the effectiveness of lines to carry high bandwidth signals in situations where there is more than one metallic pair carrying similar high frequency signals in close proximity to one another. In simple terms, the signals from one channel can "leak" onto a nearby channel (which may be carrying similar signals) and appear as noise to that nearby channel. Although crosstalk is a known problem even at relatively low frequencies, the magnitude of this effect tends to increase with frequency to the extent that at frequencies in excess of a few tens of Megahertz (depending on the length of the channels in question), the indirect coupling can be as great as the direct coupling.

In order to alleviate the problems caused by crosstalk (especially Far End Cross Talk or "FEXT" as it is known) a technology known as vectoring has been developed in which knowledge of the signals sent over crosstalking lines is used to reduce the effects of the crosstalk. In a typical situation a single DSLAM acts as a co-generator of multiple downstream signals over multiple cross-talking channels and also as a co-receiver of multiple upstream signals from the same multiple cross-talking channels, with each of the channels terminating at a single Customer Premises Equipment (CPE) modem such that no common processing is possible at the CPE ends of the channels. In such a case, downstream signals are pre-distorted to compensate for the expected effects of the cross-talking signals being sent over the neighboring cross-talking channels such that at reception at the CPE devices the received signals are similar to what would have been received had no cross-talking signals been transmitted on the cross-talking channels. Upstream signals on the other hand are post-distorted (or detected in a manner equivalent to their having been post-distorted) after being received at the co-receiver (the DSLAM) in order to account for the effects of the cross-talk which has leaked into the signals during their transmission.

SUMMARY

In a first aspect, the present disclosure provides a method of transmitting data in a communication system comprising a transmitter and a plurality of receiver devices, each receiver device being connected to the transmitter device via a respective communication channel. The method comprises: i) precoding the data for transmission on the channels (e.g. based on a channel transfer matrix), thereby to provide first precoded data; ii) using the first precoded data, for each of the channels, computing a number of bits to be allocated to that channel; iii) determining that the bit allocation does not satisfy one or more predetermined criteria; iv) ranking the channels in an order based on one or more channel properties; v) discarding for use as a direct channel, one or more of the channels based on the ranking; vi) precoding the data for transmission on the channels such that the one or more discarded channels are not used as a direct channel, thereby to provide second precoded data; and vii) transmitting, by the transmitter, the second precoded data on the channels.

In embodiments (ii) to (vi) may be performed iteratively until it is determined that the one or more predetermined criteria is satisfied.

In embodiments iii) may comprise determining that the bit allocation does not achieve a maximum bit limit on one or more of the channels.

The method may further comprise, for each channel, determining the potential channel capacity for ith channel ($PC_i$) with $$PC_i = \sum_j \|h_{i,j}\|^2,$$

where i and j are indices for the channels, and $h_{i,j}$ is a channel transfer function dependent on crosstalk transmissions from the jth channel onto the ith channel. In embodiments iv) may comprise ranking the channels based on the determined values of $PC_i$. In embodiments v) may comprise discarding either the channel with the maximum $PC_i$ value or the minimum $PC_i$ value.

In embodiments i) may comprise precoding the data using a first precoder matrix $P=H^{-1}$, where H is the channel transfer matrix.

In embodiments vi) may comprise precoding the data using a second precoder matrix $P=H_{sub}^H (H_{sub}H_{sub}^H)^{-1}$, where $H_{sub}$ is a channel transfer matrix for the channels that have not been discarded for use as a direct channel.

The channels may be direct channels. The channels may be wire connections, e.g. twisted metallic pairs.

In embodiments ii) may comprise performing a water filling algorithm.

In embodiments ii) may comprise maximizing:

$$\sum_{i,k} b_i^k$$

subject to:

$$0 \le b_i^k \le b_{max}, \forall i,k$$

$$E[\rho_i^k] \le PSD^k, \forall i,j$$

where: i is an index for the channels; j is an index for the channels; k is a frequency index for one or more different tones; $b_i^k$ is a number of bits to be loaded onto the ith channel for the kth tone; $b_{max}$ is a maximum bit limit; $\rho_i^k$ is an instantaneous value of power after precoding for transmission on the ith channel for the kth tone; and $PSD^k$ is a transmission power mask for tone k.

In some aspects:

$$E[\rho_i^k] = \sum_{j=1}^{N} |p_{i,j}|^2 * s_i^k$$

where: $p_{i,j}$ is the (i, j)th element in a precoder matrix P; and $s_i^k$ is a signal power for transmission on the ith channel at the kth tone.

The channels may be a vectored group of channels.

In a further aspect, the present disclosure provides an apparatus for use in a communication system, the communication system comprising a transmitter and a plurality of receiver devices, each receiver device being connected to the transmitter device via a respective communication channel. The apparatus comprises one or more processors configured to: i) precode the data for transmission on the channels based on a channel transfer matrix, thereby to provide first precoded data; ii) using the first precoded data, for each of the channels, compute a number of bits to be allocated to that channel; iii) determine that the bit allocation does not satisfy one or more predetermined criteria; iv) rank the channels in an order based on one or more channel properties; v) discard for use as a direct channel, one or more of the channels based on the ranking; vi) precode the data for transmission on the channels such that the one or more discarded channels are not used as a direct channel, thereby to provide second precoded data; and vii) cause the transmitter to transmit the second precoded data on the channels.

In a further aspect, the present disclosure provides a program or plurality of programs arranged such that when executed by a computer system or one or more processors it/they cause the computer system or the one or more processors to operate in accordance with the method of any of the preceding aspects.

In a further aspect, the present disclosure provides a machine-readable storage medium storing a program or at least one of the plurality of programs according to the preceding aspect.

BRIEF DESCRIPTION OF THE DRAWINGS

In order that the present disclosure may be better understood, embodiments thereof will now be described with reference to the accompanying drawings in which.

SPECIFIC DESCRIPTION OF EMBODIMENTS

In the below description, reference will be made to modes of communication. Herein, the term "mode" is used to indicate the nature of the manner in which signals are transmitted between transmitter and receiver. In particular, as will be appreciated by persons skilled in the art, there are three principal such modes of communication: differential mode, phantom mode, and common mode. In all three of these modes the signal is transmitted (excited) and received (observed) as the (changing) potential difference (voltage differential) between two voltages (or equivalently between one "live" voltage and one "reference" voltage). In the differential mode the signal is transmitted/observed as the difference in potential between two wires (typically between two wires of a twisted metallic pair). In the phantom mode at least one of the voltages is the average voltage of a pair of wires (note that such average can vary without impacting on a signal carried in the differential mode across that same pair of wires. Finally, the common mode refers to the case where one of the voltages being compared is the "Earth" or ground reference voltage (or something substantially similar for telecommunications purposes). It is possible for various mixed modes to also be used for carrying signals.

Reference is also made throughout the below description to direct and indirect coupling and direct and indirect channels. A direct channel is one in which the same physical medium and the same mode of transmission is used for both the transmission of the signal and for the reception of the signal. Thus, a differential mode transmission across a single twisted metallic pair (TMP) wire connection from transmitter to receiver would constitute a direct (differential mode) channel between the transmitter and the receiver. By contrast, a channel in which the transmitter transmitted a signal onto a second TMP in differential mode but was received by a receiver from a first TMP in differential mode (the signal having "crosstalked" across from the second to the first pair) is an example of an indirect channel, as is a case in which a signal is transmitted by a transmitter in a phantom mode across the averages of the voltages of the wires in each of a first and second TMP and received (having "crosstalked/mode" converted) by a receiver connected to just the first TMP in differential mode.

Figure 1:
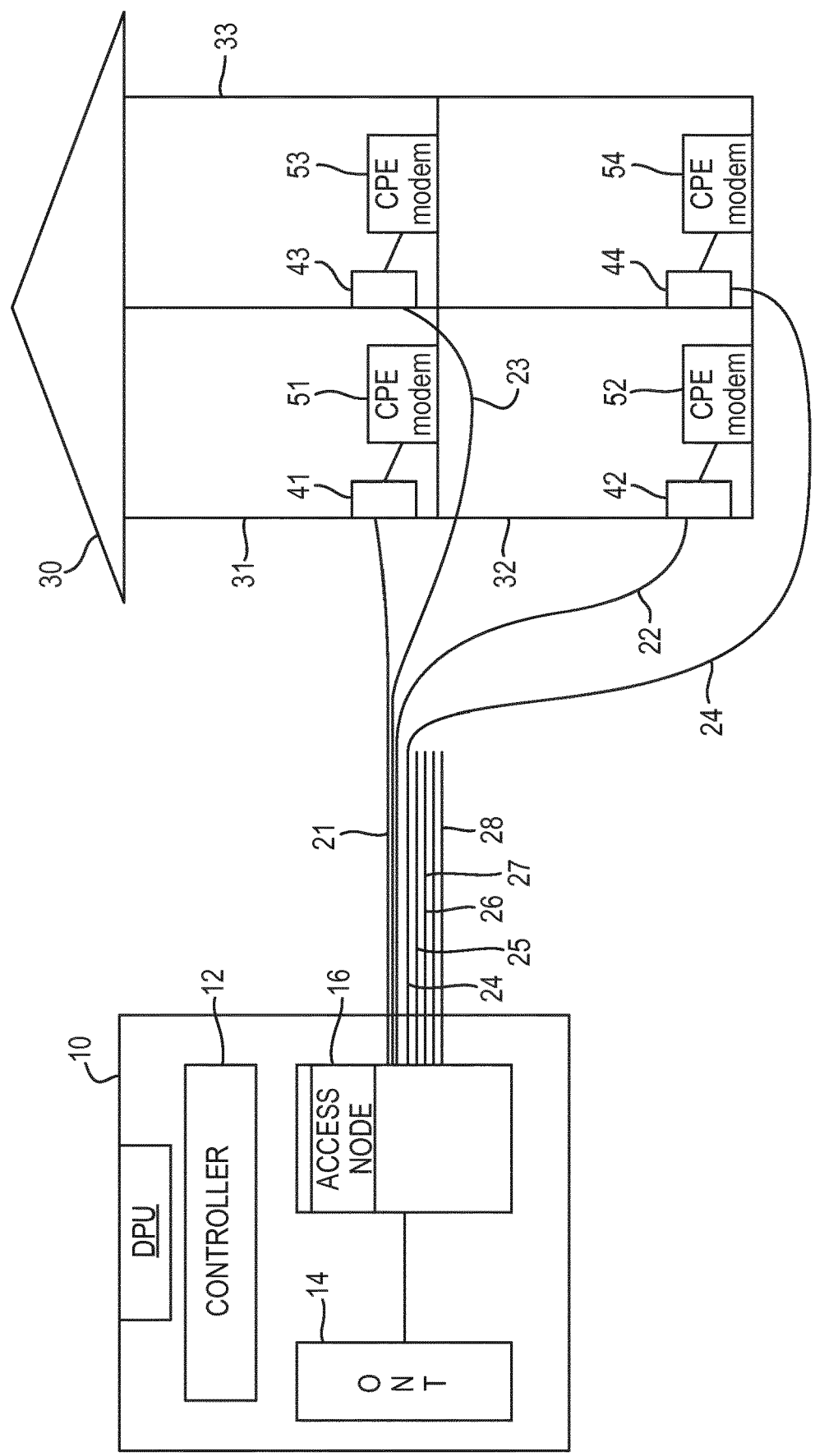
FIG. 1 is a schematic illustration (not to scale) of an example broadband deployment.

Referring now to the Figures, FIG. 1 is a schematic illustration (not to scale) of an example broadband deployment in which embodiments of a data transmission method may be employed.

In this example, the deployment comprises a Distribution Point Unit (DPU) 10 which is connected to four user premises 31, 32, 33, 34 (which in this example are flats within a single building 30) via respective Twisted Metallic Pair (TMP) connections (which may also be referred to as "lines"), namely a first TMP connection 21, a second TMP connection 22, a third TMP connection 23, and a fourth TMP 24. The TMP connections 21-24 connect between an Access Node (AN) 16 (which may, for example, be a DSLAM) within the DPU 10 and respective Customer Premises Equipment (CPE) modems 51-54 via respective network termination points 41-44 within the respective user premises 31-34.

In this example, the deployment further comprises a plurality of further TMP connections 25-28, namely a fifth TMP connection 25, a sixth TMP connection 26, a seventh TMP connection 27, and an eighth TMP connection 28. In this example, each further TMP connection 25-28 is connected at one of its ends to the AN 16 such that a signal may be transmitted (and/or received) along that further TMP connection 25-28 by the AN 16. Also, each further TMP connection 25-28 may be, at its end distal with respect to the AN 16, either be connected to a respective receiver (and/or transmitter), or be disconnected from any electronic device.

In this example, the TMP connections 21-28 are contained within a common binder (not shown in the Figures) over at least a portion of their lengths. For example, the TMP connections 21-28 may be contained within the common binder at least between a point at or proximate to where the TMP connections 21-28 exit from/enter to the DPU 10 and a point at which the first to fourth TMP connections 21-24 diverge from the further TMP connections 25-28 to connect to the respective user premises 31-34. In this example, the binder is a flexible, electrically non-conductive casing or sheath (e.g. made of plastics) that surrounds, and holds together the bundle of TMP connections 21-28.

In this example, the DPU 10 additionally includes an Optical Network Termination (ONT) device 14 which provides a backhaul connection from the DPU 10 to a local exchange building via an optical fiber connection such as a Passive Optic-fiber Network (PON) and a controller 12 which co-ordinates communications between the AN 16 and the ONT 14, and which may perform some management functions such as communicating with a remote Persistent Management Agent (PMA).

As will be apparent to a person skilled in the art, the illustrated deployment involving an optical fiber backhaul connection from a distribution point and a twisted metallic pair connection from the distribution point to the "customer" premises is a sort of deployment for which the G.FAST standard is intended to be applicable. In such a situation, the TMP connections may be as short as a few hundred meters or less, for example possibly a few tens of meters only, and because of this it tends to be possible to use very high frequency signals (e.g. up to a few hundred Megahertz) to communicate over the short TMPs because the attenuation of high frequency signals is insufficient to prevent them from carrying useful information because of the shortness of the channels. However, at such high frequencies crosstalk can become a significant issue. This tends to be the case where the cross-talking channels travel alongside each other for part of their extent (as in the situation illustrated in FIG. 1); however, cross-talk is also tends to be an issue at high frequencies (e.g. over 80 MHz) even where the channels only lie close to one another for a very small portion of their total extent (e.g. just when exiting the DPU 10). G.fast proposes simply using vectoring techniques at all frequencies where there are cross-talking channels in order to mitigate against the cross-talk effects.

In some embodiments, the DPU 10 (for example, the AN 16) exploits signals (which may be considered to be supporting signals) transmitted onto the further TMP connections 25-28 and/or phantom channels which will "crosstalk" onto the differential mode channels associated with each of the end user receivers (the termination point and CPE modem combinations 41/51, 42/52, 43/53, 44/54), and changes the signals received (compared to a conventional case where the further TMP connections 25-28 and phantom channels are not exploited in this way).

Figure 2:
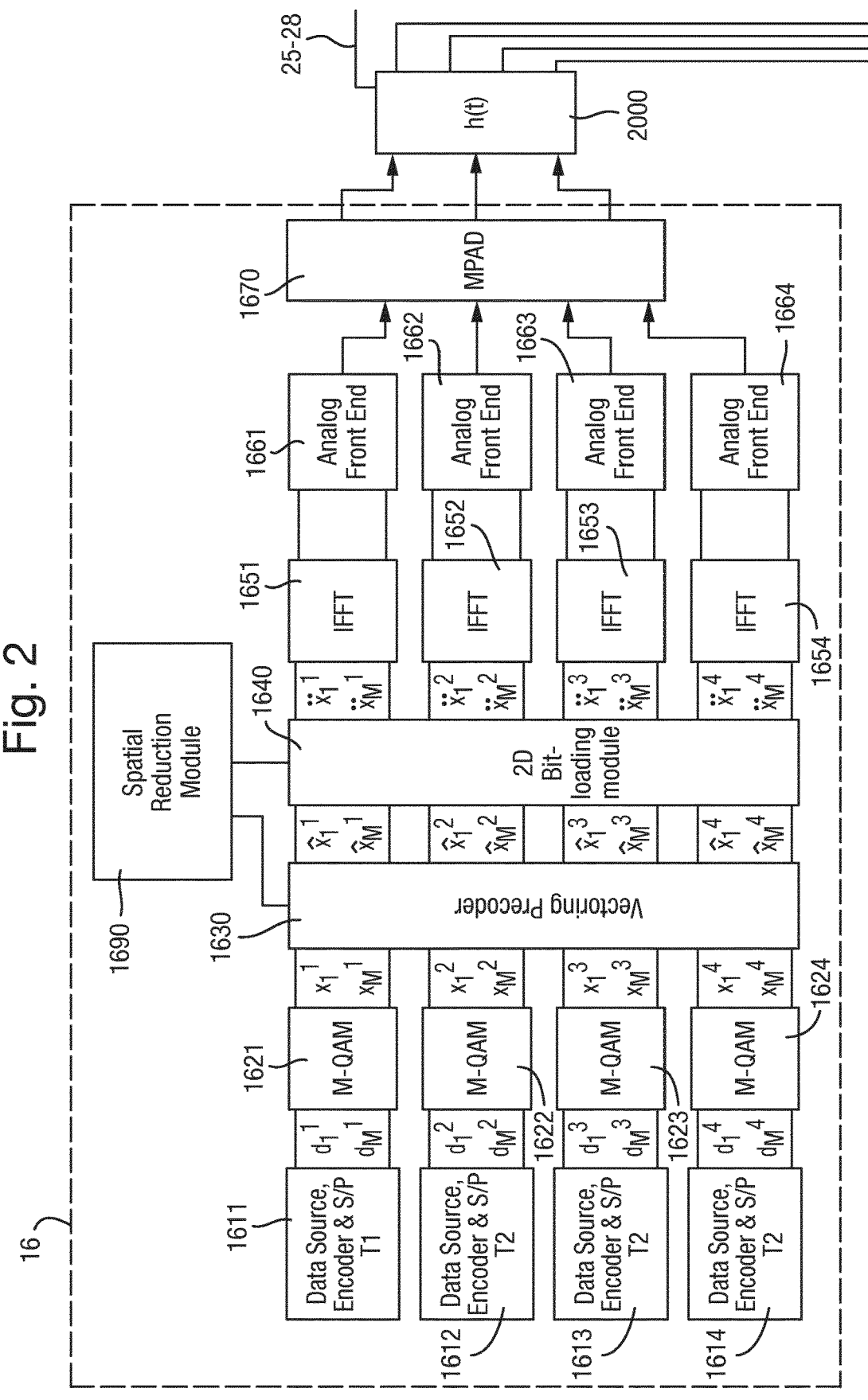
FIG. 2 is a schematic illustration (not to scale) showing further specific details of the broadband deployment.
Figure 2:
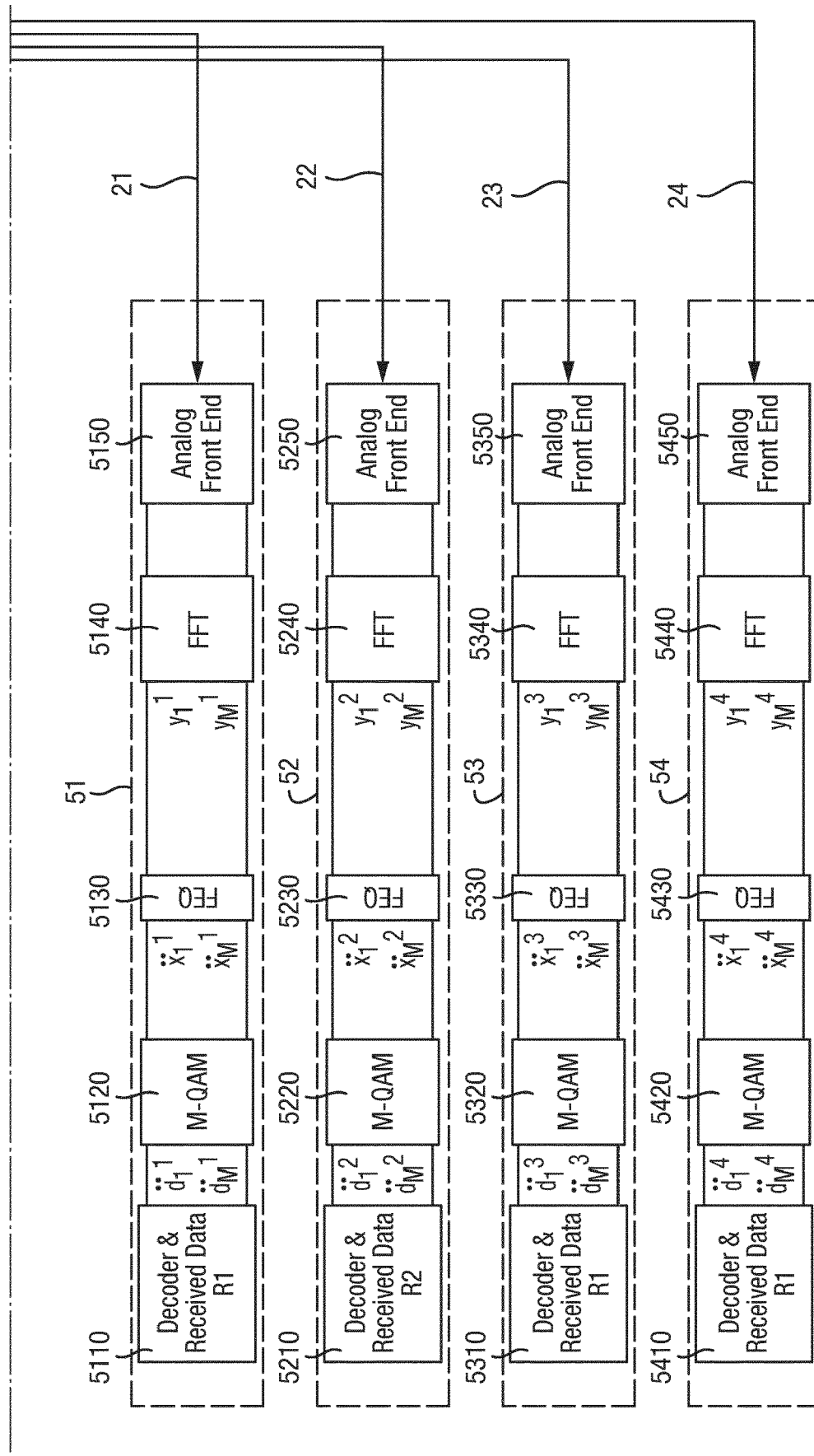

FIG. 2 is a schematic illustration (not to scale) showing further details of the AN 16 and CPE modems 51-54 that allow for data transmission according to below described embodiments.

The AN 16 comprises first, second, third, and fourth Data Source, Data Encoder and Serial to Parallel converter (DSDESP) modules 1611, 1612, 1613, 1614. These are essentially conventional functions within a DSL modem and will not be further described here except to point out that each one's output is a set of data values $d_1$-$d_M$ each of which can be mapped to both a set of one or more bits and to a point within a modulation signal constellation associated with a respective tone on which the data value is to be transmitted. For example, if a tone $t_1$ is determined to be able to carry 3 bits of data, a corresponding data value will be set to one of $2^3$=8 different values (e.g. to a decimal number between 0 and 7) each of which corresponds to a different constellation point within an associated signal constellation having 8 different constellation points. The data values for a single symbol can be thought of as forming a vector of data values (one for each data-carrying tone) and together carry the user data to be transmitted to the end user associated with a respective end user modem 51-54 together with any overhead data (e.g. Forward Error Correction data, etc.).

The data values leaving each DSDESP module 1611, 1612, 1613, 1614 are then passed (in an appropriate order) to respective Multiple bit level Quadrature Amplitude Modulation (M-QAM) modulators 1621, 1622, 1623, 1624 which convert each input data value to a respective complex number $x_1^1$ to $x_M^1$, $x_1^2$ to $x_M^2$, $x_1^3$ to $x_M^3$, and $x_1^4$ to $x_M^4$ each of which represents a complex point within a complex number constellation diagram. For example, a data value $d_1^1$=7 (=111 in binary) might be mapped by the M-QAM modulator 1621 to the complex number 1-i for tone 1 where tone 1 has been determined (by say modem 51) to be able to carry 3 bits of data each.

Each of these complex numbers $x_1^1$ to $x_M^1$, $x_1^2$ to $x_M^2$, $x_1^3$ to $x_M^3$, and $x_1^4$ to $x_M^4$ is then entered into a vectoring precoder module 1630 (which in the present embodiment is a single common vectoring precoder module 1630) which performs a largely conventional vectoring operation in order to precode the transmissions to be sent using a combination of predetermined vectoring coefficients and information about the signals to be transmitted onto the other channels within the relevant vector group in a manner, which is well known to those skilled in the art, to compensate for the expected effects of cross-talk from the other channels in the vector group.

In some embodiments, the vectoring precoder module 1630 is operable to additionally precode the transmissions in such a way as to cause them to be pre-compensated for the expected crosstalk effects produced not only by the neighboring channels operating in a direct differential mode (as per standard vectoring), but also for the effects of crosstalk coming from any signals being transmitted onto one or more phantom channels (or other channels which are not direct differential mode channels). In order to do this, the vectoring precoder module 1630 may receive information about channel estimations of the respective phantom channel(s) (or other channels which are not direct differential mode channels) and also information about any weighting values used to combine signals to be transmitted over the phantom channel(s) (or other channels which are not direct differential mode channels).

The vectoring precoder module 1630 may receive weighting values and channel estimation values which it may use to perform its precoding functions. Appropriate values for the channel estimations and the weighting values used by the vectoring precoder module 1630 may be determined using data reported back from the end user modems 51-54. The processes and procedures for achieving this are largely conventional and well known to persons skilled in the art and so they are not discussed in great detail herein except to note that it may utilize a backward path from the user modems 51-54 to the AN 16. This may be achieved in practice in that the user modems 51-54 are transceivers capable of receiving and transmitting signals over the TMPs 21-24 as is the AN 16. The receiver parts of the AN 16 and the transmitter parts of the user modems 51-54 have simply been omitted from the drawings to avoid unnecessary complication of the figures and because these parts are entirely conventional and not directly pertinent to the present invention. Moreover, each of the user modems 51-54 may additionally contain a management entity responsible for performing various processing and communication functions. Any of a multitude of suitable techniques can be employed for obtaining data useful in generating channel estimations. For example, known training signals can be transmitted onto selected channels by the AN 16 during a special training procedure and the results of detecting these by the user modems 51-54 can be sent back to the AN 16 in a conventional manner. Additionally, special synchronization symbols can be transmitted, interspersed with symbols carrying user data, at predetermined "locations" within a "frame" comprising multiple symbols (e.g. at the beginning of each new frame) and the results of attempting to detect these synchronization symbols can also be sent back to the AN 16 to generate channel estimation values. As is known to persons skilled in the art, different synchronization signals/symbols can be sent over different channels simultaneously and/or at different times etc. so that different channel estimations (including importantly indirect channels and indirect channels can be targeted and evaluated, etc.

In this embodiment, the output from the vectoring precoder module 1630 is a set of further modified complex numbers $\hat{x}_1^1$ to $\hat{x}_M^1$, $\hat{x}_1^2$ to $\hat{x}_M^2$, $\hat{x}_1^3$ to $\hat{x}_M^3$, and $\hat{x}_1^4$ to $\hat{x}_M^4$. These complex numbers are then passed to a two-dimensional (2D) bit-loading module 1640. As described in more detail later below, the 2D bit-loading module 1640 is configured to perform 2D bit-loading on the modified complex numbers received from the vectoring precoder module 1640, thereby to produce further modified (or further pre-distorted) values for the complex numbers. Thus, two-dimensional (2D) bit-loading module 1640 modifies the received numbers $\hat{x}_1^1$ to $\hat{x}_M^1$, $\hat{x}_1^2$ to $\hat{x}_M^2$, $\hat{x}_1^3$ to $\hat{x}_M^3$, and $\hat{x}_1^4$ to $\hat{x}_M^4$ to generate corresponding further modified complex numbers $\ddot{x}_1^1$ to $\ddot{x}_M^1$, $\ddot{x}$ to $\ddot{x}_M^2$, $\ddot{x}_1^3$ to $\ddot{x}_M^3$, and $\ddot{x}_1^4$ to $\ddot{x}_M^4$. In this embodiment, this 2D bit-loading is performed to determine the optimal number of bits to be loaded onto each TMP 21-24 and each tone. The 2D bit-loading module 1640 is further configured to determine whether the determined optimal bit-loading satisfies a power spectral density (PSD) mask. In this embodiment, the PSD mask for a tone is an upper threshold for power for signal transmission at that tone above which power value transmission is not permitted. The transmission power mask(s) may be set, for example, by an official regulatory body. The 2D bit-loading module 1640 is further configured to, if a maximum bit-loading is achieved for all tones, pass the further modified complex numbers $\ddot{x}_1^1$ to $\ddot{x}_M^1$, $\ddot{x}$ to $\ddot{x}_M^2$, $\ddot{x}_1^3$ to $\ddot{x}_M^3$, and $\ddot{x}_1^4$ to $\ddot{x}_M^4$ to the IFFTs 1651-1654. The further modified complex numbers $\ddot{x}_1^1$ to $\ddot{x}_M^1$, $\ddot{x}$ to $\ddot{x}_M^2$, $\ddot{x}_1^3$ to $\ddot{x}_M^3$, and $\ddot{x}_1^4$ to $\ddot{x}_M^4$ then form (ultimately) the signals to be used in driving the respective TMPs 21-24 in direct differential mode. The 2D bit-loading module 1640 is further configured to, if the maximum bit-loading is not achieved for all tones, pass the further modified complex numbers to the spatial reduction module 1690. In some embodiments, if the maximum bit-loading is achieved for a given tone for all lines, but overall transmission power can be reduced, then the 2D bit-loading module 1640 passes the further modified complex numbers to the spatial reduction module 1690.

In some embodiments, the vectoring precoder 1630 and/or the 2D bit-loading module 1640 may additionally generate one or more new sets of complex numbers, for example $\ddot{x}_1^5$ to $\ddot{x}_M^5$, $\ddot{x}_1^6$ to $\ddot{x}_M^6$, $\ddot{x}_1^7$ to $\ddot{x}_M^7$, and $\ddot{x}_1^8$ to $\ddot{x}_M^8$, for forming (ultimately) the signals to be used to drive a respective further TMP 24-28, or a respective (single ended) phantom mode channel.

Any appropriate way of generating the sets of complex numbers ($\ddot{x}_1^1$ to $\ddot{x}_M^1$, etc.) may be performed. Once these values have been calculated they are passed to the respective IFFT modules 1651-1654, with super-script 1 values going to IFFT 1651, superscript 2 values going to IFFT 1652, and so on. The next two steps of the processing are conventional and not relevant to the present invention. Each set of generated values (e.g. $\ddot{x}_1^1$ to $\ddot{x}_M^1$) is formed by the respective IFFT module into a quadrature time domain signal in the normal manner in Orthogonal Frequency Division Multiplexing (OFDM)/Discrete Multi-Tone (DMT) systems.

The time domain signals are then processed by a suitable Analogue Front End (AFE) module 1661-1664 again in any suitable such manner including any normal conventional manner. After processing by the AFE modules 1661-1664, the resulting analogue signals are passed to a Multiple Phantom Access device (MPAD) module 1670. The MPAD module 1670 passes the signals from AFEs 1661-1664 directly to the corresponding TMPs 21-24 for driving in the normal direct differential mode.

During transmission over the TMP connections 21-24 the signals will be modified in the normal way according to the channel response of the channel and due to external noise impinging onto the connections. In particular, there will typically be crosstalking (including, for example, far-end crosstalking) between the four direct channels (the direct channels being from the transmitter 16 to the modems 41-44 via the TMPs 21-24), the further channels provided by the further TMP connections 25-28, and any phantom channels. However, the effect of the precoding is to largely pre-compensate for the effects of the crosstalk. Additionally, the targeted receivers may benefit from increased SNR of the received signal destined for them arriving via crosstalk from one or more of the further TMP connections 25-28, and/or the phantom channel.

After passing over the TMP connections 21-24 the signals are received by the modems 41-44 at a respective Analogue Front End (AFE) module 5150, 5250, 5350, 5450 which performs the usual analogue front-end processing. The thus processed signals are then each passed to a respective Fast Fourier Transform (FFT) module 5140, 5240, 5340, 5440 which performs the usual conversion of the received signal from the time domain to the frequency domain. The signals leaving the FFT modules 5140, 5240, 5340, 5440 $y_1^1$ to $y_M^1$, $y_1^2$ to $y_M^2$, $y_1^3$ to $y_M^3$, and $y_1^4$ to $y_M^4$ are then each passed, in the present embodiment, to a respective Frequency domain EQualizer (FEQ) module 5130, 5230, 5330, 5430. The operation of such frequency domain equalizer modules 5130, 5230, 5330, 5430 is well-known in the art and will not therefore be further described herein. It should be noted however, that any type of equalization could be performed here, such as using a simple time-domain linear equalizer, a decision feedback equalizer, etc. For further information on equalization in OFDM systems, the reader is referred to: "*Zero Forcing Frequency-Domain Equalization for Generalized DMT Transceivers with Insufficient Guard Interval,*" by Tanja Karp, Steffen Trautmann, Norbert J. Fliege, EUR-ASIP Journal on Applied Signal Processing 2004:10, 1446-1459.

Once the received signal has passed through the AFE, FFT and FEQ modules, the resulting signals $\ddot{x}_1^1$ to $\ddot{x}_M^1$, $\ddot{x}$ to $\ddot{x}_M^2$, $\ddot{x}_1^3$ to $\ddot{x}_M^3$, and $\ddot{x}_1^4$ to $\ddot{x}_M^4$ tend to be similar to the complex numbers $x_1^1$ to $x_M^1$, $x_1^2$ to $x_M^2$, $x_1^3$ to $x_M^3$, and $x_1^4$ to $x_M^{41}$ originally output by the M-QAM modules 1621-1624, except that there may be some degree of error resulting from imperfect equalization of the channel and the effect of external noise impinging onto the channels during transmission of the signals between the AN 16 and the modems 51-54. This error will in general differ from one receiving modem to the next. This can be expressed mathematically as $\ddot{x}_m^1 = x_m^1 + e_m^1$ etc. Provided the error however is sufficiently small the signal should be recoverable in the normal way after processing by the M-QAM demodulator modules 5120-5420 where a corresponding constellation point is selected for each value $\ddot{x}_m^i$ depending on its value (e.g. by selecting the constellation point closest to the point represented by the value $\ddot{x}_m^i$ unless trellis coding is being used, etc.). The resulting values $\ddot{d}_1^1$ to $\ddot{d}_M^1$, $\ddot{d}_1^2$ to $\ddot{d}_M^2$, $\ddot{d}_1^3$ to $\ddot{d}_M^3$, and $\ddot{d}_1^4$ to $\ddot{d}_M^4$ should mostly correspond to the data values $d_1^1$ to $d_M^1$, $d_1^2$ to $d_M^2$, $d_1^3$ to $d_M^3$, and $d_1^4$ to $d_M^4$ originally entered to the corresponding M-QAM modules 1621, 1622, 1623, 1624 respectively within the AN 16. These values are then entered into a respective decoder (and received data processing) module 5110, 5210, 5310, 5410 which reassembles the detected data and performs any necessary forward error correction etc. and then presents the recovered user data to whichever service it is addressed to in the normal manner, thus completing the successful transmission of this data.

Returning now to the description of the spatial reduction module 1690, in this embodiment the spatial reduction module 1690 is configured to receive the further modified complex numbers $\ddot{x}_1^1$ to $\ddot{x}_M^1$, $\ddot{x}$ to $\ddot{x}_M^2$, $\ddot{x}_1^3$ to $\ddot{x}_M^3$, and $\ddot{x}_1^4$ to $\ddot{x}_M^4$ from the 2D bit-loading module 1640 responsive to the 2D bit-loading module 1640 determining that maximum bit-loading is not achieved on all lines for all tones. The spatial reduction module 1690 is further configured to, for each tone, order or rank the TMPs 21-24 based on their potential capacity at that tone, and to discard as a direct channel one or more of the TMPs 21-24 based on the ordering determined for that tone. The spatial reduction module 1690 is further configured to communicate which of the TMPs 21-24 have been dropped as direct channels to the vectoring precoder module 1640 and/or the 2D bit-loading module 1640. Vectoring by the vectoring precoder module 1640 and bit-loading by the 2D bit-loading module 1640 may be reperformed taking into account the line(s) discarded as direct channels.

Apparatus, including the vectoring precoder module 1640, the 2D bit-loading module 1640, and the spatial reduction module 1690, for implementing the above arrangement, and performing the method to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine-readable storage medium such as computer memory, a computer disk, ROM, PROM etc., or any combination of these or other storage media.

Figure 3:
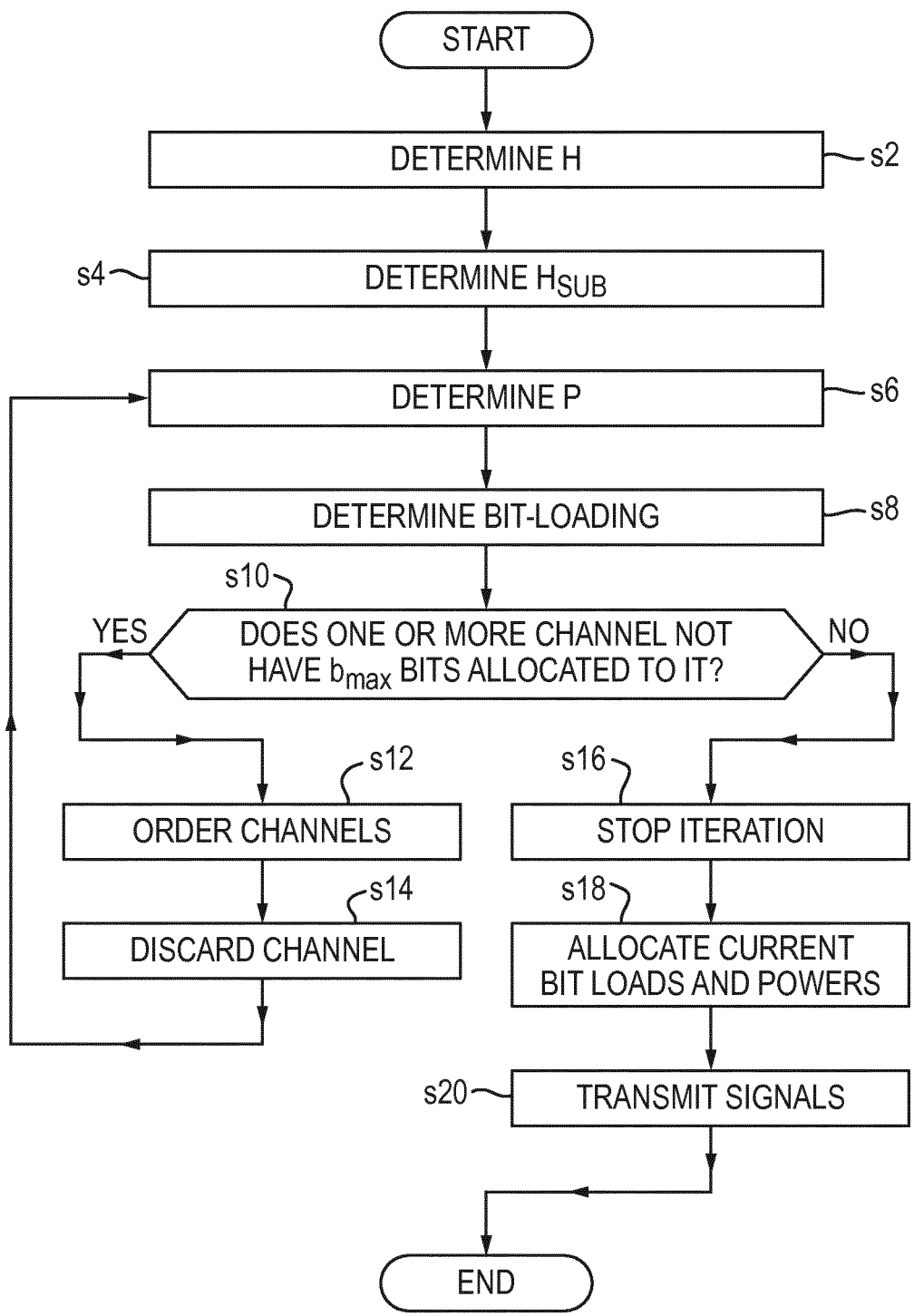
FIG. 3 is a process flow chart showing a data transmission method.

FIG. 3 is a process flow chart showing an embodiment of the data transmission method. The process of FIG. 3 illustrates data transmission on a single, given tone. However, it will be appreciated by those skilled in the art that, in practice, the process of FIG. 3 may be performed multiple times (e.g. in series, in parallel, or partially overlapping temporally) to transmit data on multiple tones.

At s2, a channel transfer matrix H for a single frequency (i.e. mode) of the differential mode channels is determined i.e. measured. The channel transfer matrix H may be determined using known channel estimation techniques.

Considering a system comprising a bundle of N TMPs and/or phantom channels, the full transmission characteristics for a single frequency (i.e. mode) of the differential mode channels may be represented channel transfer matrix H:

$$H = \begin{pmatrix} h_{1,1} & h_{1,2} & \cdots & h_{1,N} \\ h_{2,1} & h_{2,2} & \cdots & h_{2,N} \\ \vdots & \vdots & \ddots & \vdots \\ h_{N,1} & h_{N,2} & \cdots & h_{N,N} \end{pmatrix}$$

where $h_{i,j}$ indicates a channel transfer function, a value of which is dependent on crosstalk transmissions from the jth TMP/phantom channel onto the ith TMP/phantom channel. In other words, $h_{i,j}$ is a measure of the electromagnetic coupling of the jth channel to the ith channel. For example, $h_{i,j}$ may be indicative of the extent of coupling between the jth channel and the ith channel. Values of $h_{i,j}$ may be dependent on an attenuation on the amplitude of signals on the ith channel caused by the jth channel. Values of $h_{i,j}$ may be dependent on a delay and/or phase shift on the phase of signals on the ith channel caused by the jth channel.

In this embodiment, i=1, . . . , 8 and j=1, . . . , 8.

Values of $h_{i,j}$ may be measured, for example, using test signals, by the MPAD 1670. Measurement of the $h_{i,j}$ values may comprise, or be regarded as equivalent to, measuring one or more of the following parameters selected from the group of parameters consisting of: a channel response of the ith channel under conditions in which the jth channel (e.g. only the jth channel) is transmitting crosstalk interference onto the ith channel, an impulse response of the ith channel under conditions in which the jth channel (e.g. only the jth channel) is transmitting crosstalk interference onto the ith channel, and a frequency response of the ith channel under conditions in which the jth channel (e.g. only the jth channel) is transmitting crosstalk interference onto the ith channel.

At s4, a sub-matrix of H is determined, for example by the MPAD 1670. In this embodiment, H is restricted to representing crosstalk onto the four direct channels, i.e. TMPs 21-24, i.e.

$$H_{sub} = \begin{pmatrix} h_{1,1} & h_{1,2} & \cdots & h_{1,8} \\ h_{2,1} & h_{2,2} & \cdots & h_{1,8} \\ h_{3,1} & h_{3,2} & \cdots & h_{1,8} \\ h_{4,1} & h_{4,2} & \cdots & h_{1,8} \end{pmatrix}$$

In other embodiments, a different sub-matrix or the full matrix H is considered.

At s6, a precoder matrix P is determined. The precoder matrix P may be determined by any appropriate entity, for example the vectoring precoder 1630. The precoder matrix P is used by the vectoring precoder 1630 to precode the received complex numbers $x_1^1$ to $x_M^1$, $x_1^2$ to $x_M^2$, $x_1^3$ to $x_M^3$, and $x_1^4$ to $x_M^4$, thereby to produce modified complex numbers $\hat{x}_1^1$ to $\hat{x}_M^1$, $\hat{x}_1^2$ to $\hat{x}_M^2$, $\hat{x}_1^3$ to $\hat{x}_M^3$, and $\hat{x}_1^4$ to $\hat{x}_M^4$. Thus, the vectoring precoder module 1630 precode the complex numbers $x_1^1$ to $x_M^1$, etc., to pre-compensate for the crosstalk effects expected to be experienced during data transmission.

In some embodiments, $P=H^{-1}$. Transmitting precoded data $x'=Px$ instead of x tends to give a received signal $y=Hx'=HH^{-1}x=x$.

In some embodiments, the precoder matrix P precodes only the targeted direct line channels, i.e. the TMPs 21-24. In other words, the precoder matrix P may be determined based on $H_{sub}$, e.g.

$$P = H_{sub}^H (H_{sub} H_{sub}^H)^{-1}$$

where $H_{sub}^H$ is the Hermitian of $H_{sub}$, i.e $H_{sub}^H = \overline{H}_{sub}^T$.

Thus, the vectoring precoder module 1630 generates a precoded set of data $\hat{x}_1^1$ to $\hat{x}_M^1$, $\hat{x}_1^2$ to $\hat{x}_M^2$, $\hat{x}_1^3$ to $\hat{x}_M^3$, and $\hat{x}_1^4$ to $\hat{x}_M^4$. This precoded data may be sent from the vectoring precoder module 1630 to the 2D bit-loading module 1640.

At s8, the 2D bit-loading module 1640 performs a bit-loading process on the received precoded data.

In this embodiment, the bit-loading process determines the optimal number of bit to load onto each direct channel (i.e. each of the TMPs 21-24) for the given tone. Bit-loading is a combinatorial optimization process that may be performed by maximizing the following objective function:

$$\sum_{i,k} b_i^k$$

subject to:

$0 \le b_i^k \le b_{max}, \forall i,k$ $E[\rho_i^k] \le PSD^k, \forall i,k$ where: i is an index for the direct channels, i.e. the TMPs 21-24;
j is an index for TMPs 21-28 acting as transmitters of crosstalk interference;
k is a frequency index for the different tones;
$b_i^k$ is the number of bits to be loaded onto the ith line for the kth tone;
$b_{max}$ is a maximum bit allocation that may be used;
$\rho_i^k$ is an instantaneous value for the power after precoding for transmission on the ith line for the kth tone; and
$PSD^k$ is a transmission power mask for tone k. In this embodiment, the power mask is an upper threshold for power for signal transmission at tone k above which power value transmission is not permitted.

In this embodiment, $E[\rho_i^k]$ may be determined as follows:

$$E[\rho_i^k] = \sum_{j=1}^{N} |p_{i,j}|^2 * s_i^k$$

where: $p_{i,j}$ is the (i, j)th element in the precoder matrix P; and
$s_i^k$ is a signal power for transmission on the ith channel at the kth tone.

Any appropriate bit-loading algorithm may be used to perform the bit-loading process at s8. For example, in some embodiments, bit-loading without normalization is performed following vectoring. Initial bit-loading may be adjusted across all lines (e.g. the direct channels) so that the transmission power mask is satisfied. Also for example, in some embodiments, a normalization (e.g. a crude normalization) of the precoder 1630 is performed and followed by a 2D bit-loading process.

In some embodiments, a so-called "water filling" algorithm may be used to perform bit-loading.

Thus, at s8, a bit-loading for the each of the TMPs 21-24 for the given tone is determined. The determined bit-loading satisfies, on average, the transmission power mask on each of the TMPs 21-24.

At s10, the 2D bit-loading module 1640 determines whether or not the bit-loading for the TMPs 21-24 determined at s8 provides that one or more of the TMPs 21-24 does not achieve the maximum bit limit, $b_{max}$.

If, at s10 it is determined that one or more of the TMPs 21-24 does not achieve the maximum bit limit, $b_{max}$, the 2D bit-loading module 1640 passes the current complex numbers $\ddot{x}_1^1$ to $\ddot{x}_M^1$, $\ddot{x}$ to $\ddot{x}_M^2$, $\ddot{x}_1^3$ to $\ddot{x}_M^3$, and $\ddot{x}_1^4$ to $\ddot{x}_M^4$ to the spatial reduction module 1690, and the method proceeds to step s12.

However, if, on the other hand, it is determined that all TMPs 21-24 achieve the maximum bit limit, $b_{max}$, the method proceeds to s16. Later below s16 to s20 will be described in more detail after the description of s12 and s14.

At s12, the spatial reduction module 1690 orders or ranks the channels (i.e. the TMPs 21-24 in this embodiment). In this embodiment, the channels 21-24 are ranked dependent on their potential channel capacity, which may be determined as:

$$PC_i = \sum_j \|h_{i,j}\|^2$$

where $PC_i$ is the potential channel capacity of the ith TMP 21-24.

Thus, an ordered list of the channels (i.e. TMPs 21-24) is determined. The TMPs 21-24 may be ordered in any appropriate way, for example, from maximum potential channel capacity to minimum potential channel capacity or from minimum potential channel capacity to maximum potential channel capacity. In some embodiments, the ordering based potential channel capacity is performed in a different way for different tones, for example for some tones, the TMPs 21-24 may be ordered from maximum potential channel capacity to minimum potential channel capacity while for other tones the TMPs 21-24 may be ordered from minimum potential channel capacity to maximum potential channel capacity.

In this embodiment, the channels are ranked dependent on their potential channel capacity. However, in other embodiments, for one or more tones, the channels are ranked based on one or more different properties or criteria instead of or in addition to their potential channel capacity.

At s14, using the determined order for the channels, the spatial reduction module 1690 discards one or more of the channels for use as a direct channel. In some embodiments, the one or more dropped TMPs 21-24 may be instead used as an indirect or supporting channel for transmissions on the remaining direct channel(s).

In some embodiments, the direct channel corresponding to a lowest (or minimum) potential capacity is dropped. For example, if the TMPs 21-24 are ordered from maximum potential capacity to minimum potential capacity, the TMP at the bottom of the list may be dropped. This tends to be beneficial for relatively high frequency tones and/or embodiments in which it is desirable to increase (e.g. maximize) the aggregate tone capacity.

In some embodiments, the direct channel corresponding to a highest (or maximum) potential capacity is dropped. For example, if the TMPs 21-24 are ordered from minimum potential capacity to maximum potential capacity, the TMP at the bottom of the list may be dropped. This tends to be beneficial for relatively low frequency tones and/or embodiments in which it is desirable to increase (e.g. maximize) a minimum bit rate.

A TMP 21-24 may be discarded or dropped as a direct channel by setting the elements in the corresponding row of $H_{sub}$ to be equal to zero. In other words, if the ith direct channel is to be dropped, the elements in the ith row of $H_{sub}$ are set to be equal to zero.

After dropping or discarding one or more of the TMPs 21-24 as a direct channel, the method proceeds back to s6, where an updated precoder matrix P for the data that takes into account the discarded direct channel(s) is calculated.

Thus, s6 to s14 define an iterative process in which TMPs 21-24 are discarded or dropped as direct channels until aggregate bit-loading or any other objective function cannot be further improved, e.g. a higher aggregate channel capacity cannot be achieved.

Returning now to the case where, at s10 it is determined that the bit limit is achieved on all channels, at s16 the iterative process of s6 to s14 is stopped.

At s18, the 2D bit-loading module 1640 passes the data that has been precoded with the current precoder matrix P to the relevant IFFT modules which process the data and pass the processed data to the relevant AFE modules 1661-1664 in a conventional manner. The AFE modules 1661-1664 process the received data and pass the processed data to the MPAD module 1670 in a conventional manner.

At s20, the MPAD module 1670 passes the signals received from the AFEs 1661-1664 directly to the corresponding TMPs 21-24 for driving in the normal direct differential mode. Thus, data is transmitted on all or a subset of the TMPs 21-24.

One or more of the TMPs 21-24 may have been dropped as a direct channel, and thus direct differential mode transmission does not occur on those dropped lines. However, indirect or supporting transmission may be performed on one or more of the dropped TMPs 21-24 and/or one or more of the further TMPs 25-28. Data transmission is performed in accordance with the most up-to-date (i.e. current) bit-loading and power allocation.

Thus, an embodiment of the data transmission method is provided.

What will now be described is a specific example of the above described method.

In this example, the process of FIG. 3 is first performed for a first tone which corresponds to a relatively low frequency tone of 6.624 MHz.

For this first tone, $H_{sub}$ is determined to be:

$$\begin{bmatrix} -0.2-0.7i & -0.0006-0.0007i & -0.0053+0.0014i & -0.0066+0.0028i \\ -0.0010+0.0008i & -0.2138-0.7386i & 0.0018-0.0013i & -0.0024+0.0005i \\ -0.0051+0.0011i & 0.0020-0.0007i & -0.2304-0.7341i & 0.0063-0.0023i \\ -0.0063+0.0019i & -0.0027+0.0000i & 0.0073-0.0026i & -0.2532-0.7243i \end{bmatrix}$$

Bit-loading is applied to determine an optimal power allocation. In this example, for the first tone, the power allocation is $$s^k = [s_1^k, s_2^k, s_3^k, s_4^k]^T = \begin{bmatrix} 16.36e-13 \\ 16.51e-13 \\ 16.48e-13 \\ 16.57e-13 \end{bmatrix}$$

This determined power allocation $s^k$ satisfies the PSD mask, i.e.

$$E[\rho_i^k] = \sum_{j=1}^{N} |p_{i,j}|^2 * s_i^k \leq PSD^k, \forall i, j,$$

wherein in this example $PSD^k$ is −65 dBm/Hz.

Also, in this example, for this first tone, all lines (i.e. TMPs 21-24) achieve the maximum allowed bits per line, which in this example is 14 bits/Hz/s. Thus, in this example, for this first tone of 6.624 MHz, s12-14 would be omitted and no lines 21-24 would be dropped as direct channels.

The process of FIG. 3 may also be performed for a second tone which corresponds to a relatively high frequency tone of 185.472 MHz.

For this second tone, $H_{sub}$ is determined to be:

$$\begin{bmatrix} -0.0081+0.0128i & 0.0086+0.0053i & 0.0033-0.0014i & 0.0045-0.0029i \\ -0.0107-0.0023i & -0.0100+0.0238i & -0.0038-0.0031i & -0.0020-0.0039i \\ 0.0009+0.0059i & -0.0038-0.0026i & 0.0170+0.0226i & -0.0090-0.0114i \\ -0.0083+0.0003i & 0.0008-0.0029i & -0.0072+0.0072i & 0.0180+0.0065i \end{bmatrix}$$

Vectoring and bit-loading for the second tone yields a bit-loading vector for the TMPs 21-24 of $b^k = [b_1^k, b_2^k, b_3^k, b_4^k]^T = [2, 5, 5, 4]^T$.

In this example, this bit-loading does not achieve the maximum bit-loading in each direct channel, which in this example is 14 bits/Hz/s. Thus, in this example, for this second tone of 185.472 MHz, s12-14 are performed as follows.

In this example, a value of $$PC_i = \sum_j \|h_{i,j}\|^2$$

is determined for each of the direct channels 21-24 (indexed by i=1, . . . , 4), and the direct channels 21-24 are ordered based on these determined values. In this example, this yields a ranking of the direct channels, from highest potential capacity to lowest potential capacity, of $[3, 2, 4, 1]^T$, in which the numbers indicate channel indices i.

In this example, the direct channel corresponding to the lowest channel capacity (i.e. the lowest value of $PC_i$) is discarded as a direct channel. Thus, the first TMP 21 (i.e. the direct channel indexed by i=1) is dropped as a direct channel.

An updated precoder matrix P is calculated, and bit-loading reperformed. This reperformed bit-loading using the updated precoder matrix P yields a bit-loading vector for the TMPs 21-24 of $b^k = [b_1^k, b_2^k, b_3^k, b_4^k]^T = [0, 8, 7, 6]^T$.

The power allocation $s^k$ associated with this reperformed bit-loading satisfies the PSD mask, and also the direct channels (i.e. the second to fourth TMPs 22-24) achieve the maximum allowed bits per line, which in this example is 14 bits/s/Hz. Thus, in this example, iteration of s6-s14 is stopped, and signals are transmitted at the second tone in accordance with the current bit-loading and power allocation.

Advantageously, the above described method and apparatus tend to provide improved overall channel capacity.

A further advantage provided by the above described method and apparatus is that convergence to an optimal solution tends to be relatively fast compared to conventional processes.

A further advantage provided by the above described method and apparatus is that the PSD mask is satisfied. The PSD mask limits power output on a tone-by-tone basis.

The solutions provided by the above described algorithms tend to shape the transmitted signals according to the channel response to improve data transmission, e.g. to maximize the delivered data. Also, the above described methods and apparatus tend to take into account the maximum available power and the hardware limitations in transceiver design.

The above described methods and apparatus advantageously tend to provide improved use of power budget, and also match the power budget to channel behavior.

Advantageously, it tends to be possible to implement the above described methods and apparatus for G.fast and XG.fast at all frequencies.

Advantageously, any complex functionality for implementing certain preferred embodiments of the invention can reside solely in the access network (e.g. at an AN or DSLAM, etc.) rather than requiring any special Customer Premises Equipment (CPE).

The above described methods and apparatus advantageously tend to reduce computational complexity and power consumption both at transmitters and receivers.

It should be noted that certain of the process steps depicted in the flowchart of FIG. 3 and described above may be omitted or such process steps may be performed in differing order to that presented above and shown in FIG. 3.

Furthermore, although all the process steps have, for convenience and ease of understanding, been depicted as discrete temporally-sequential steps, nevertheless some of the process steps may in fact be performed simultaneously or at least overlapping to some extent temporally.

It should be noted that the described embodiments are couched in terms of the downstream direction of data only (i.e. from an Access Node/DSLAM to Customer Premises Equipment (CPE) devices). However, in a practical implementation the "transmitter" of the above embodiments (e.g. the Access Node) also, naturally, functions as a receiver for upstream transmissions from the various CPE devices (which are also therefore in practice operating as transceivers rather than just receivers). Embodiments of the disclosure may operate in an entirely conventional manner in the upstream direction.

In the above embodiments, the DPU is connected to four user premises via respective direct TMP connections which connect between the AN within the DPU and respective CPE modems within the respective user premises. However, in other embodiments, the DPU is connected to a different number of user premises (e.g. more than three) via respective one or more direct TMP connections. In some embodiments, the DPU is connected to a different number of CPE modems via respective one or more direct TMP connections. In some embodiments, one or more user premises comprises multiple CPE modems.

In the above embodiments, there are four indirect TMP connections between the DPU and the user premises. However, in other embodiments, there is a different number of indirect TMP connections, for example, more than four.

The invention claimed is:

1. A method of transmitting data in a communication system comprising a transmitter and a plurality of receiver devices, each receiver device of the plurality of receiver devices being connected to the transmitter via a respective communication channel, the method comprising:
   i) precoding the data for transmission on the respective communication channels, thereby to provide first precoded data;
   ii) using the first precoded data, for each of the respective communication channels, computing a number of bits to be allocated to that respective communication channel;
   iii) determining that the bit allocation does not achieve a maximum bit limit on one or more of the respective communication channels;
   iv) responsive thereto, ranking the respective communication channels in an order dependent on their potential channel capacities;
   v) discarding for use as a direct channel, one or more of the respective communication channels based on the ranking;
   vi) precoding the data for transmission on the respective communication channels such that the one or more discarded channels are not used as a direct channel, thereby to provide second precoded data; and
   vii) transmitting, by the transmitter, the second precoded data on the respective communication channels.

2. The method according to claim 1, wherein (ii) to (vi) are performed iteratively until it is determined that the one or more predetermined criteria is satisfied.

3. The method according to claim 1, further comprising, for each respective communication channel, determining $PC_i = \Sigma_j \|h_{i,j}\|^2$, where i and j are indices for the respective communication channels, and $h_{i,j}$ is a channel transfer function dependent on crosstalk transmissions from a jth channel onto an ith channel, and wherein iv) comprises ranking the respective communication channels based on the determined values of $PC_i$.

4. The method according to claim 3, wherein v) comprises discarding either the respective communication channel with the maximum $PC_i$, value or respective communication channel with the minimum $PC_i$, value.

5. The method according to claim 1, wherein i) comprises precoding the data using a first precoder matrix $P=H^{-1}$, where H is a channel transfer matrix.

6. The method according to claim 1, wherein vi) comprises precoding the data using a second precoder matrix $P=H_{sub}^H(H_{sub}H_{sub}^H)^{-1}$, where $H_{sub}$, is a channel transfer matrix for respective communication channels that have not been discarded for use as a direct channel.

7. The method according to claim 1, wherein the respective communication channels are wire connections.

8. The method according to claim 1, wherein ii) comprises performing a water filling algorithm.

9. The method according to claim 1, wherein ii) comprises maximizing:

$$\sum_{i,k} b_i^k$$

subject to:

$$0 \le b_i^k \le b_{max}, \forall i,k$$

$$E[p_i^k] \le PSD^k, \forall i,$$

where:
i is an index for the respective communication channels;
j is an index for the respective communication channels;
k is a frequency index for one or more different tones;
$b_i^k$ is a number of bits to be loaded onto an ith channel for a kth tone;
$b_{max}$ is a maximum bit limit;
$p_i^k$ is an instantaneous value of power after precoding for transmission on the ith channel for the kth tone; and
$PSD^k$ is a transmission power mask for tone k.

10. The method according to claim 9, wherein:

$$E[p_i^k] = \sum_{j=1}^{N} |p_{i,j}|^2 * s_i^k$$

where:
$p_{i,j}$ is an (i, j)th element in a precoder matrix P; and
$s_i^k$ is a signal power for transmission on the ith channel at the kth tone.

11. The method according to claim 1, wherein the respective communication channels are a vectored group of channels.

12. An apparatus for use in a communication system, the communication system comprising a transmitter and a plurality of receiver devices, each receiver of the plurality of receiver devices being connected to the transmitter via a respective communication channel, the apparatus comprising:

one or more processors configured to:
i) precode the data for transmission on the respective communication channels, thereby to provide first precoded data;
ii) using the first precoded data, for each of the respective communication channels, compute a number of bits to be allocated to that channel;
iii) determine that the bit allocation does not achieve a maximum bit limit on one or more of the respective communication channels;
iv) responsive thereto, rank the respective communication channels in an order dependent on their potential channel capacities;
v) discard for use as a direct channel, one or more of the respective communication channels based on the ranking;
vi) precode the data for transmission on the respective communication channels such that the one or more discarded channels are not used as a direct channel, thereby to provide second precoded data; and
vii) cause the transmitter to transmit the second precoded data on the respective communication channels.

13. A non-transitory computer-readable storage medium storing a program or plurality of programs arranged such that when executed by a computer system or one or more processors the program or plurality of programs cause the computer system or the one or more processors to operate in accordance with the method of claim 1.

14. A method of transmitting data in a communication system comprising a transmitter and a plurality of receiver devices, each receiver device of the plurality of receiver devices being connected to the transmitter via a respective communication channel, the method comprising:
i) precoding the data for transmission on the respective communication channels, thereby to provide first precoded data;
ii) using the first precoded data, for each of the respective communication channels, computing a number of bits to be allocated to that respective communication channel, wherein the computing comprises maximizing:

$$\Sigma_{i,k} b_i^k$$

subject to:

$$0 \le b_i^k \le b_{max}, \forall i,k$$

$$E[p_i^k] \le PSD^k, \forall i,$$

where:
i is an index for the respective communication channels;
j is an index for the respective communication channels;
k is a frequency index for one or more different tones;
$b_i^k$ is a number of bits to be loaded onto an ith channel for a kth tone;
$b_{max}$ is a maximum bit limit;
$p_i^k$ is an instantaneous value of power after precoding for transmission on the ith channel for the kth tone; and
$PSD^k$ is a transmission power mask for tone k;
iii) determining that the bit allocation does not satisfy one or more predetermined criteria;
iv) ranking the respective communication channels in an order based on one or more channel properties;
v) discarding for use as a direct channel, one or more of the respective communication channels based on the ranking;

vi) precoding the data for transmission on the respective communication channels such that the one or more discarded channels are not used as a direct channel, thereby to provide second precoded data; and vii) transmitting, by the transmitter, the second precoded data on the respective communication channels.

* * * * *

UNITED STATES PATENT AND TRADEMARK OFFICE
CERTIFICATE OF CORRECTION

PATENT NO. : 11,838,069 B2
APPLICATION NO. : 15/733353
DATED : December 5, 2023
INVENTOR(S) : Liam Stigant et al.

It is certified that error appears in the above-identified patent and that said Letters Patent is hereby corrected as shown below:

On the Title Page

In Column 2, Line 2, below "Rahman" insert -- (74) Attorney, Agent, or Firm - Patterson Thuente IP --, as a new field entry.

In the Specification

In Column 7, Line 50, delete "$\ddot{x}$" and insert -- $\ddot{x}_1^2$ --.

In Column 7, Line 63, delete "$\ddot{x}$" and insert -- $\ddot{x}_1^2$ --.

In Column 7, Line 65, delete "$\ddot{x}$" and insert -- $\ddot{x}_1^2$ --.

In Column 9, Line 9, delete "$\ddot{x}$" and insert -- $\ddot{x}_1^2$ --.

In Column 9, Line 12, delete "$x_M^{41}$" and insert -- $x_M^4$ --.

In Column 9, Line 41, delete "$\ddot{x}$" and insert -- $\ddot{x}_1^2$ --.

In Column 11, Line 21, delete "i.e $H_{sub}^{'H'}$" and insert -- i.e. $H_{sub}^H$ --.

In Column 12, Line 24, delete "$\ddot{x}$" and insert -- $\ddot{x}_1^2$ --.

In the Claims

In Column 16, Line 66, in Claim 3, delete "$h_{ij}$," and insert -- $h_{i,j}$ --.

In Column 17, Line 6, in Claim 4, delete "$PC_i$," and insert -- $PC_i$ --.

In Column 17, Line 7, in Claim 4, delete "$PC_i$," and insert -- $PC_i$ --.

Signed and Sealed this
Twenty-eighth Day of May, 2024

*Katherine Kelly Vidal*
Katherine Kelly Vidal
*Director of the United States Patent and Trademark Office*

CERTIFICATE OF CORRECTION (continued)
U.S. Pat. No. 11,838,069 B2

In Column 17, Line 14, in Claim 6, delete "$H_{sub}$," and insert -- $H_{sub}$ --.

In Column 17, Line 34, in Claim 9, delete "$E[p_i^k] \leq PSD^k, \forall i,$" and insert -- $E[\rho_i^k] \leq PSD^k, \forall i,$ --.

In Column 17, Line 44, in Claim 9, delete "$p_i^k$" and insert -- $\rho_i^k$ --.

In Column 18, Line 46, in Claim 14, delete "$E[p_i^k] \leq PSD^k, \forall i,$" and insert -- $E[\rho_i^k] \leq PSD^k, \forall i,$ --.

In Column 18, Line 57, in Claim 14, delete "$p_i^k$" and insert -- $\rho_i^k$ --.